United States Patent Office 3,528,781
Patented Sept. 15, 1970

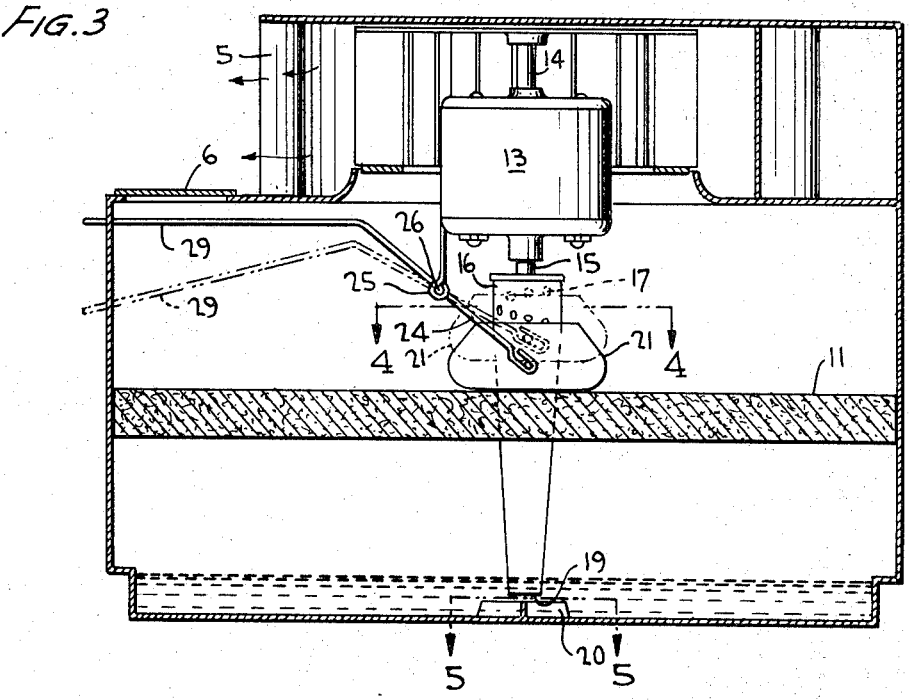

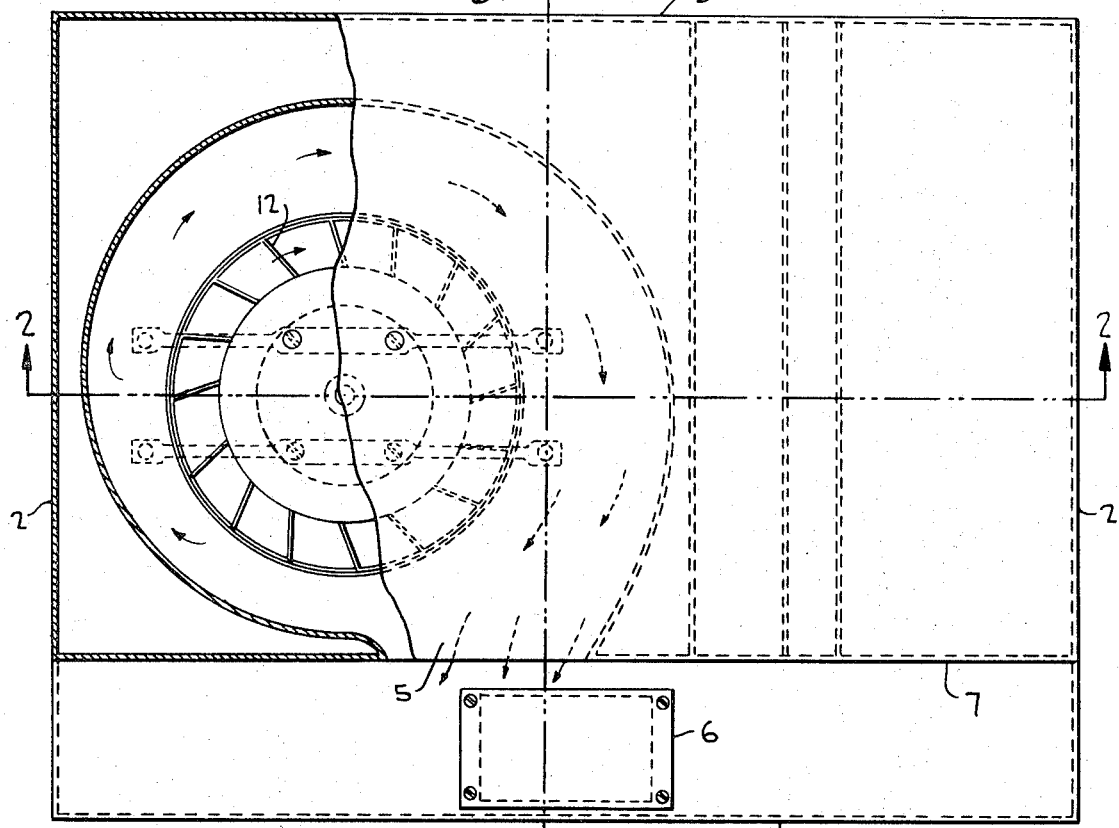
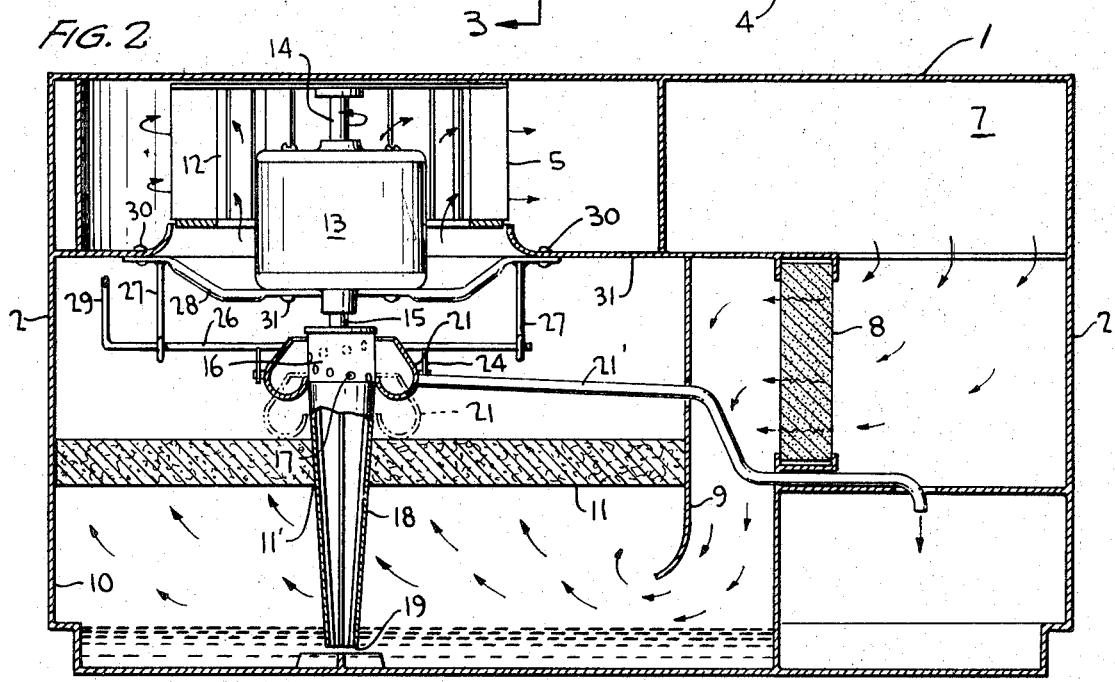

---

3,528,781
AIR POLLUTANT REMOVAL APPARATUS HAVING HORIZONTAL BED FOR AIR - LIQUID CONTACT
Stanley Gelfman, 4455 Douglas Ave., New York, N.Y. 10471, and Amos Turk, 7 Tarrywile Lake Drive, Danbury, Conn. 06810
Filed Jan. 26, 1968, Ser. No. 700,974
Int. Cl. B01d 47/02
U.S. Cl. 23—284          9 Claims

ABSTRACT OF THE DISCLOSURE

The apparatus consists of a gas-liquid contact chamber including a horizontal positioned contact bed characterized by sodium carbonate impregnated alumina granules for the removal of air pollutants, a reservoir positioned below the said bed for containing a liquid to be used for contacting said absorbent to enhance its performance for removal of air pollutants, a rotatable, tapered pump whose lower end extends into the contacting liquid, said pump having a spray head above said bed, which spray head consists of a vertically perforated end section, the gas-liquid contacting chamber having an opening for introducting air across said bed, an electric motor for driving said pump positioned above said spray head, and including a centrifugal blower means thereabove and driven thereby for exhausting purified air passed through said bed and liquid into a discharge outlet attached to said contacting chamber.

---

The apparatus is for practically eliminating the gaseous pollutants from the ambient air that passes through it, and for simultaneously also decreasing the solid particulates in the same; it is particularly adapted for the removal of sulfur dioxide from air. The apparatus comprises an eletctric motor as the prime mover of the unit. It has a shaft extending both above and below the said motor, at the upper end of which shaft there is attached a centrifugal blower wheel. Below the motor there is attached to the shaft a combined fluid (liquid) pump and sprayer; the sprayer is above the pump and joined to it, and the sprayer has a series of circumferentially spaced holes, and preferably also at different vertical levels. The fluid pump, which is below the spray head, has a plurality of vertically positioned vanes projecting centrally from the inner surface of the pump, which is positioned vertically as is the sprayer. Below the level of the holes in the sprayer, and there is a stationary, horizontal pollutant contact bed having a tapering hole at approximately its center through which the correspondingly tapering liquid pump extends, forming a snug fit between the two but permitting the pump to revolve. For the removal of sulfur dioxide or other acidic substances in gases, this contact bed is activated alumina that has an impregnation of sodium carbonate on its multiple surfaces of the subdivided, granular substance; the role of the sodium carbonate is to react with the sulfur dioxide and other acidic gases.

Preferably this apparatus has a particulate filer to remove pollens, etc., located between the passageway's inlet for ambient air and the reservoir basin into which the liquid falls. The treated, purified air exhaust is at the end of the passageway that is beyond the centrifugal blower wheel. All the aforesaid mentioned parts are encased except that the two passageways that have open ends respectively for introduction and expulsion of the air; there is an opening with door giving access to the reservoir basin for the introduction or removal of water and soluble chemicals into the reservoir basin.

The ambient air first passes through the particulate filer for the removal o fsamll, air-borne particles, such as dust and pollens. The partially treated air thereafter is drawn first downwardly into the reservoir area, then upwardly, due to the suction of the blower, through the contact bed for the removal of pollutants in the air via chemical reaction.. It is then exhausted through the upper exit.

Below the inlet of the revolving liquid pump is a means, such as "spoiler vanes," to prevent water from funneling; a pair of partitions intersect at right angles to provide the vanes.

In order to revivify the contact bed there is provided a torus with drain pipe that is pivoted for elevation from its normal position to its upper position, where it surrounds the sprayer for draining off water with impurities removed from the contact bed. In the lower (or air purification) position of the torus it is below the level of the sprayer. There is a snug fit between the exterior of the tapering pump and the sides of the hole in the contact bed, so that air sucked up by the blower must pass through the said contact bed and not through any holes other than the fine passageways of the contact bed; otherwise the purpose of this invention would be defeated.

When the reactant in the contact bed is significantly depleted, the contact bed is freed of the reaction products by circulation of water from the reservoir basin which water rises through the revolving pump, then is sprayed onto the contact bed; circulation is continued until the result is accomplished, then the torus is elevated wherepon the water with impurities is drained off. To reimpregnate, the reactant, such as sodium carbonate, and water, introduced into the basin reservoir, after solution results is thereupon circulated as previously described by means of the revolving pump and sprayer. At this stage the contact bed is moist. Activated alumina has the inherent property of retaining moisture during air purification, which is necessary for the reaction with acidic gases.

SPECIFICATION AND CLAIMS OF THE PATENT APPLICATION OF STANLEY GELFMAN AND AMOS TURK

This invention relates to an apparatus for the removal removal of gaseous impurities and also fine, entrained particles from air, which are either deleterious or obnoxious or both to human beings. It is particularly suitable for the removal of sulfur dioxide and other acidic gases as well as particulates from the air that human beings breathe. It is common knowledge that serious health problems, due to polluted air, are attributable to the combination of sulfur dioxide and particulates. The last embrace particles, such as pollens and dust. The combination of sulfur dioxide and particulates causes respiratory problems, especially among those that for various reasons find difficulty in breathing.

It is an object of the present invention to provide an apparatus that will remove particulates by a filter, then by a reaction bed of solid material in granular condition, by contact of the impure gas therewith, remove deleterious or obnoxious gaseous substances from the air. Whereas this apparatus is particularly suitable for the removal of sulfur dioxide and other acidic gases from ambient air, it could remove other acidic, deleterious gases. The nature of the impurities will vary; manufacturing plants and public utility plants as well as automobiles throw off into the air large quantities of impurities, and the nature of such impurities will depend significantly on the sources.

It is a more specific object of the present invention to provide an apparatus that has a centrifugal blower wheel positioned near the top, which blower wheel is connected to an electric motor below it, a stationary, horizontal contact bed, said bed being of a nature for the removal of gaseous impurities from the air, a removable sprayer and pump connected to the lower part of the motor by a shaft arrangement, the pump having an inlet at its lower end, the pump being vertically positioned, and the sprayer joined to the pump being above it and having circumferentially spaced holes that will spray a liquid over the contact bed where the pollutants are removed; the blower pulls up the air through the contact bed, then discharges the purified air through an outlet from the apparatus.

It is a more particular object of the present invention to have an apparatus as recited in the above paragraph, whose contact bed for the removal of gaseous pollutants is of a solid material having great surface area to permit great surface contact of the impure gas with the small, subdivided granules thereof, the mesh being suitable for current pressure drop above the said horizontal contact bed; these granules of solid material are impregnated with a chemical that will react with the gaseous impurities in the ambient air under moist conditions (for sulfur dioxide removal the impregnant is preferably sodium carbonate, and the subdivided material is activated alumina).

It is an object of the present invention to provide an apparatus for the removal of deleterious and/or obnoxious gaseous substances from air and also particulates, which apparatus is characterized by an electric motor activated centrifugal blower wheel above said motor, also a combined vertically positioned liquid pump and sprayer, connected as in the centrifugal blower wheel through a vertical shaft arrangement but below the said electric motor, and a fixed horizontal contact bed for the removal of gaseous pollutants made of subdivided solid material positioned below the circumferentially spaced holes in the sprayer, and a particulate filter within the apparatus in the air entrance passageway near the air entrance.

It is a still more specific object of the present invention to have an apparatus for the purification of air, suitable for the removal of sulfur dioxide but not restricted to sulfur dioxide, that is characterized by a motor having attached thereto a shaft extending both above and below said motor, which shaft has a centrifugal blower wheel attached to its upper end, and a vertically positioned liquid pump and sprayer attached to the lower end of said shaft, the said pump having a plurality of vanes likewise vertically positioned and projecting inwardly from its interior surface, the inlet of which liquid pump is at a lower extremity thereof, the sprayer part having a plurality of spaced holes around the periphery thereof to spray the liquid horizontally and descending, a stationary horizontal contact bed that removes gaseous pollutants positioned below the discharge holes in the said sprayer but above the inlet of the liquid pump, and air passageway with air inlet that directs the air to enter below the said contact bed, and an air passageway with air exhaust connected to the blower, the recited parts being encased, whereby the air enters solely through the aforesaid inlet passageway, is drawn downwardly, then upwardly through the contact bed where it engages the large surface area of the granular material in the contact bed, and finally is exhausted through the aforesaid outlet passageway. The contact surfaces in the contact bed are made wet from the circulating fluid that is sprayed from the holes of the sprayer by this arrangement before the air is purified. The purpose of the vanes projecting inwardly from the inner surface of the vertical pump is to lift the liquid vertically to the holes in the sprayer for centrifugal ejection from the sprayer. The liquid pump tapers vertically from its upper end of greatest circumference and makes a snug fit with a corresponding tapering hole that is in the approximate middle of the contact bed.

For the removal of sulfur dioxide from air the contact bed is preferably subdivided (granular) activated alumina that is impregnated with sodium carbonate for the removal of fluoride gases from air the contact bed may be activated carbon that is impregnated with sodium silicate solution, "water glass."

It is a further object of this invention to have in the combination as recited in the second paragraph supra a particulate filter near the air inlet and within the inlet passageway and on the other side of the entry point of the air in the basin reservoir at the base of the apparatus.

The apparatus of this invention has as its primary purpose to produce a contact bed for the removal of gaseous pollutants, and when feebly effective to remove the reaction products, then rejuvenating it. This is accomplished by circulating an aqueous liquid containing a reactant for the gaseous pollutant(s) by spraying the liquid over the surface of the granular solid material in a horizontal bed, whereby the granular solid material becomes impregnated and made wet; and when the reactant in the contact bed has become significantly depleted as a result of air circulation drawn through the bed, whereby the air is freed of acidic gases as a result of reaction of the acidic components with the reactant, the contact bed is freed of the reaction product by circulating water, which rises through the revolting pump and is sprayed onto the bed, this step being repeated until the above mentioned result is attained. The water with dissolved impurities from the reactions is collected in the toroidal catch basin and drained off through a pipe attached to the said toroidal basin. To re-impregnate, the reactant, such as sodium carbonate, dissolved in water, introduced in the basin reservoir, is circulated as previously described by means of rotating pump and sprayer. At this stage the contact bed is moist, and when well impregnated, is ready for use.

The apparatus of the present invention consists of an electric motor near the top of the apparatus, which is connected to a shaft that extends both above and below the said motor; at the upper end of the apparatus the centrifugal blower is connected to the upper end of this shaft. On the shaft on the underside of the motor there is connected a liquid fluid pump and sprayer, the latter part above the pump; the pump and sprayer are vertically positioned. The fluid pump tapers downwardly and has a plurality of vanes vertically positioned that project inwardly from the inner surface of that pump to lift liquid vertically, upon rotation of the pump, from the reservoir basin in which the intake of the fluid pump at the lower end extends. Below the inlet of the pump, on the floor of the reservoir basin, there are "spoiler vanes;" these are a pair of partitions intersecting at right angles to provide vanes. If the liquid funnels it can not be pumped, and the "spoiler vanes" prevent this. The sprayer has circumferentially spaced holes in its circumference, which holes are preferably vertically positioned as well. In this way the liquid ejected by the rotating pump will be evenly sprayed with effective surface coverage, the direction being both horizontal and tangential, descending downwardly. Below the level of the said holes there is a fixed, horizontal contact bed for the removal of gaseous pollutants, through which the tubular tapering, vertically positioned liquid pump extends through a likewise tapering hole, affording a good fit, permitting rapid revolving of the liquid pump. This said contact bed is made up of granular solid material, the mesh size selected being proper for correct pressure drop of the air flowing through the bed. When it is desired to remove sulfur dioxide from air, this granular contact material is activated alumina impregnated with sodium carbonate. When it is desired to remove fluoride gases from air activated carbon impregnated with sodium silicate solution, "water glass," may well be used as the contact bed. Between the air inlet in the air inlet passageway and the reservoir basin at the bottom of the apparatus is a filter for removing particulates. It is composed of expanded polyurethane or suitable cellulose or fibrous media. Below the pollutant-removal contact bed just described there is a reservoir basin into which the liquid pump projects. The air inlet passageway also leads downwardly into the reservoir basin below the level of said contact bed, whereby the partially purified air will rise through the contact bed for a much greater purification. There is a filler door to this reservoir basin through which water and chemicals are introduced. Connected to the centrifugal blower wheel is a passageway for the expulsion of purified air through the outlet of said passageway. The recited parts of the apparatus are encased, the openings in which apparatus are the air inlet opening and the exhaust opening previously referred to above and the covered opening with door. It is essential that there be no holes in the encasement than these, whereby ambient air would be sucked into the system without contacting the pollutant-removal bed.

Because it becomes necessary to reactivate the pollutant-removal contact bed, there is provided a toroidal basin for liquid, contiguous with the circumferential sprayer. It is raised to surround the sprayer when the water and chemical products from the reaction are to be drained off in the reactivation of the bed; and it is lowered out of the way when the bed is being impregnated, or subsequently during air purification. The elevating mechanism is attached to the torus, and elevates both it and the torus drain pipe; and the same mechanism is used to lower the torus and the drain pipe. The elevated position of the said torus is not the functioning position for air purification, only that during revivication of the contact bed; its lower position is the position for air purification. There must be a close fit between the tapering fluid pump's exterior surface and the inside of the contact bed's hole, so that air can not be drawn through a bad fit opening but must travel the more resistant passageways in the contact bed.

Some further points on the operation of the apparatus on the purification of air would seem to be proper to include in this disclosure, and will be accordingly, set forth, preceded by a description of the preparation of the bed.

The resultant horizontal velocity of the individual streams of liquid with chemical solute therein from the holes in the periphery of the sprayer is a function of the revolutions per minute of the liquid pump and the diameter at that point of the holes. Immediately upon exit from the holes in the revolving sprayer, the streams of liquid with impregnating solute therein are acted upon by gravity with the result that the jets enter a parabolic curve. This results in the jets of liquid striking the top of the gaseous pollutant-removal contact bed. The distance away from the center of rotation that the individual jets strike is proportional to the height of the existing hole of each individual jet above the top surface of the said pollutant-removal bed. The liquid impacting the contact bed drains down through the bed, while keeping the impregnated surfaces of the granular solid material thereof wet. The bed is now ready. The action of the centrifugal blower wheel at the top of the apparatus draws up the air through the particulate filter near the air entrance opening, then through the reservoir basin section of the apparatus, then through the gaseous pollutant-removal contact bed, and finally expelling the air through the exhaust opening. The intimate contact between the ambient air passing upwardly through the bed having an impregnated reactant results in the complete removal of the gaseous impurities, more specifically sulfur dioxide and other acidic gases from the ambient air; the so purified air is exhausted through the exhaust opening at the top of the apparatus.

A problem encountered with a wet pollutant-removal contact bed of this high efficiency is that the very large contact area between the air and chemicals the impregnating of the granular solid material causes a very high rate of evaporation of solvent (water) of the reacting chemicals. As a result, the reaction solute is left as a dry deposit on the subdivided carrier material. But in the use of this apparatus, although the pollutant-removal contact bed appears to be dry, it is chemically effectively wet, due to the hygroscopicity of activated alumina, or to the affinity of activated alumina for water. This property causes the activated alumina to absorb humidity from the air and this humidity, now concentrated on the surface, effectively allows continuous chemical inter-action between the gaseous impurities (sulfur dioxide) in the ambient air and the sodium carbonate impregnated in the activated alumina. The sulfur dioxide in the presence of moisture changes by reaction to a mixture of sodium sulfite and sodium sulfate. The reactions involved are:

$$SO_2 + Na_2CO_3 \rightarrow Na_2SO_3 + CO_2$$
$$SO_2 + Na_2CO_3 + \tfrac{1}{2}O_2 \rightarrow Na_2SO_4 + CO_2$$

In this way the sulfur dioxide is removed from the air by reaction and being deposited on the contact bed. When the surface of the activated alumina contact bed becomes too fouled with the aforesaid reaction products, it can be reactivated very simply by adding water through the water and chemical feed door, shown in the drawing of this invention. The water will fall to the bottom of the reservoir basin, then will be picked up and elevated by the liquid pump and then sprayed over the entire top surface of the said pollutant-removal contact bed. As it seeps through the bed, the liquid will dissolve the water-soluble chemicals therein, namely sodium sulfite and sodium sulfate and the remaining sodium carbonate. When this is complete, the toroidal catch basin is raised to where it surrounds the sprayer, and the liquid in the reservoir basin is caused to rise through the revolving pump and sprayed, whereupon the impure liquid is drained off from the apparatus. After purification of the contact bed it is thereupon re-impregnated with sodium carbonate by introducing this chemical and water via the door to the reservoir, and this solution circulated and sprayed as previously described. The high rate of evaporation due to the air flow again causes the solvent to evaporate, leaving a freshly impregnated (sodium carbonate) activated alumina. Due to the very minute amount of sulfur dioxide in the ambient air, it will take a long period of time before the sodium carbonate, which has been originally incorporated in the activated alumina, has been changed to a majority of sodium sulfite and sodium sulfate. When that time arrives a fresh packet of sodium carbonate and water as previously described can be introduced through the door after purification of the contact bed. The simple method of reactivating and rejuvenating the pollutant-removal contact bed is believed to be unique. The time when necessary for reactivation by simple use of water and packet of sodium carbonate after purification of the bed will be shown by indicator lights that can be installed on the apparatus; this latter arrangement forms no part of the present invention however.

These objects, structure and advantages of the present invention will appear in the course of the following description, in which the drawing illustrates the preferred embodiment of the present invention.

FIG. 1 is a plan, top view partly broken away of the apparatus.

FIG. 2 is a side view, partly in section, along line 2—2 of FIG. 1, showing the interior of the apparatus.

FIG. 3 is a sectional view along lines 3—3 of FIG. 1.
FIG. 4 is a sectional view along line 4—4 of FIG. 3.
FIG. 5 is a sectional view along line 5—5 of FIG. 3.

Referring to the drawing, FIGS. 1, 2 and 3, the hood comprises a flat, horizontal top wall 1, a back wall 3 vertical, and vertical side walls numbered 2, and front wall 4. As seen from FIG. 3 (view along lines 3—3, therefore a side view), the top wall does not come as far as side wall 2, there being an air vent exit, denoted by numeral 5. There is a door 6 shown in FIG. 1 for the introduction of water and soluble chemicals, such as sodium carbonate or -silicate, for a purpose that will be explained subsequently. The air enters through air inlet 7 at the upper right, as shown in FIG. 2 and as shown in FIG. 1. The air passes through the particulate filter 8 positioned vertically; this filter removes pollens and dust particles from the air. The air passes downwardly under baffle 9 into basin reservoir 10, then upwardly through contact bed 11, for the removal of gaseous pollutants; it usually made of activated alumina impregnated with sodium carbonate, for the removal of sulfur dioxide and other acidic gases from the air, but not limited to this contact medium. The purified air, freed both from small entrained particles and acidic gases, is drawn by the centrifugal blower wheel 12 and ejected through air exit 5, previously referred to above. The electric motor 13 is the prime mover of the unit. It has a shaft which extends both above and below the said motor, to the upper end of which 14 is attached a centrifugal blower wheel 12. Below the motor and to the lower end 15 of the shaft is attached a combined liquid pump and sprayer. The sprayer 16 has a cylindrical surface with spaced holes 17 in its periphery; and as shown in FIGS. 2 and 3 these holes are at different vertical levels too. The liquid vertical pump, which is joined above to the liquid sprayer, tapers toward its bottom end 19, the inlet to said pump. From FIG. 2 it will be perceived that liquid pump 18 projects through an opening 11' in bed 11. From FIG. 4 it will be perceived that the pump has spaced vertical, contour-following vanes 23, projecting centrally from the inner surface of the pump. The role or function of these vanes is to cause the liquid, either for impregnating the contact bed or for purifying it to be drawn upwardly from the reservoir basin 10 and sprayed by means of sprayer 16 onto the top surface of the contact bed 11. Below the inlet end 19 of the liquid pump is a mechanism, shown at the bottom portion of FIG. 3, and in FIGS. 2 and 4 also, and in more detail in FIG. 5, known as "spoiler vanes," numbered 20, to prevent liquid from funneling; the structure is that of partitions intersecting at right angles.

In the above description the electric motor has been termed the prime mover of the unit. For when it is desired to use the unit for purifying air, this motor produces the rotation of the centrifugal blower wheel, which wheel draws in the impure air through the particulate filter 8, then under baffle 9, then upwardly through pollutant-removal stationary contact bed 11, then expels the purified air through exit 5.

After a period of use the contact bed will need to be purified and thereafter impregnated. The apparatus has a drain torus 21, which can be elevated so that it surrounds the sprayer 16 and its holes 17, as shown in FIGS. 2 and 3. It is used only for taking off water with dissolved impurities, mainly sodium sulfite and sodium sulfate resulting from sulfur dioxide removal from air; the nature of these impurities can vary as explained supra. There is a linkage 24 attached at its lower end 22 to the torus 21; the linkage pivots at 25 on rod 26, which is supported by parallel rods 27, which are affixed at their respective upper ends to outer ends of the motor support 28. By pressing downwardly on lever rod 29, as shown in FIG. 3, this causes linkage 24 to assume its elevated position, shown in dotted lines in FIG. 3, causing also the torus to assume upper the position shown in FIG. 2; the horizontal dotted lines in FIG. 2 show the position before pressing down on lever rod 29. Attached to the torus is a drain pipe 21', which extends outwardly then downwardly; this pipe carries off the impure liquid from the revivication of the contact bed.

Reference was made supra to door 6. Through the opening below it, which the door normally covers, there is introduced water and soluble chemicals basic in reaction, which latter are to impregnate the pollutant-removal contact bed. From FIGS. 1 and 3 it will be perceived that this door is at the top of the apparatus toward the very front thereof. The water and/or chemicals drop into reservoir basin 10. Only during impregnation step of the contact bed 11, or during revivication thereof is the liquid pump with attached sprayer put into use. And the torus is only put into use during the removal of the impure liquid containing the sodium sulfite and -sulfate or other reactant impurities. Arrows in FIGS. 1 and 2 show the direction of air movement. Arrows also show direction of rotation of the cage-type blower.

It is essential as to the pollutant-removal contact bed that there be a snug fit between the tapering exterior of the liquid pump 18 with the inside circular tapering edge of hole 11' of the stationary contact bed, otherwise openings small or large would cause the air to be sucked up therethrough and not through the contact bed, thus defeating the very purpose of the apparatus of this invention.

While there has been described and illustrated what is now deemed to be the best embodiment of the principles of this invention, it is obvious that many changes may be made in detail without departing from the principles of this invention as defined in the appended claims.

We claim as our invention:

1. In an apparatus for the purification of air, suitable particularly for the removal of acidic gases, the combination of a motor having attached thereto a vertical shaft extending both above and below the said motor, which shaft has a centrifugal blower wheel attached to its upper end, and a vertically positioned liquid pump tapering downwardly to its lower end, and positioned below the motor, having a plurality of vertically positioned vanes extending inwardly from its interior surface, and a sprayer attached to the said shaft positioned above the upper end of the said pump, which sprayer has holes spaced both circumferentially and vertically around its periphery to give a greater area of the spray than otherwise and more even spray of the liquid during operation of the liquid pump with sprayer, the inlet of the liquid pump being at its lower extremity, a stationary, horizontal contact bed that removes gaseous pollutants positioned below the discharge holes in the said sprayer but above the inlet of the pump, there being a correspondingly tapering hole in the contact bed that will make a snug fit with the contiguous outer surface of the pump to minimize the passage of air, a basin reservoir below the contact bed, means below the inlet of the rotatable pump and within the basin reservoir to prevent the liquid from funneling, and an air passageway with air inlet joined to the basin reservoir, an air exhaust connected to the blower wheel, the sprayer, contact bed and liquid pump being encased, the basin reservoir being a part of the encasement, whereby the air enters substantially solely through the inlet passageway, is drawn by suction of the blower wheel into the reservoir, then upwardly through the contact bed, where it engages the large surface of the material in the said contact bed, and finally is exhausted through the aforesaid outlet passageway as purified air.

2. In an apparatus as set out in claim 1, the combination wherein the means below the inlet of the vertical pump to prevent the funneling comprises a pair of partitions intersecting at right angles to provide vanes.

3. In an apparatus for the purification of air, suitable particularly for the removal of acidic gases, the combination of a motor having attached thereto a vertical shaft extending both above and below the said motor, which shaft has a centrifugal blower wheel attached to its upper end, and a vertically positioned liquid pump tapering downwardly to its lower end and positioned below the said motor, having a plurality of vertically positioned vanes extending inwardly from its interior surface, and a sprayer attached below the motor to said shaft above the upper end of said pump, the inlet of which pump is at its lower extremity, the sprayer having a plurality of spaced holes around its periphery to spray the liquid horizontally, a toroidal catch basin movable vertically to an upper position to surround the sprayer to collect the sprayed liquid and also movable to a lower position where it does not surround the sprayer, a stationary, horizontal contact bed that removes gaseous pollutants positioned below the discharge holes in the said sprayer but above the inlet of the sprayer's pump, there being a correspondingly tapering hole in the contact bed that will make a snug fit with the contiguous outer surface of the pump to minimize passage of air, a basin reservoir below the contact bed, means below the rotatable pump to prevent the liquid from funneling, and an air inlet joined to the reservoir basin, an air exhaust connected to the blower wheel, the pump, sprayer, and contact bed being encased, the basin reservoir being a part of the encasement, whereby the air enters through the aforesaid inlet passageway, is drawn by suction of the blower wheel into the basin reservoir, then upwardly through the contact bed, where it engages the large surface area of the material in the said bed, and finally is exhausted through the aforesaid outlet passageway as purified air.

4. In an apparatus for the purification of air, suitable particularly for the removal of acidic gases, the combination of a motor having attached thereto an extended, vertical shaft, which shaft has a vertically positioned, downwardly tapering liquid pump below the said motor and having a plurality of vertically positioned vanes extending inwardly from its interior surface, and a sprayer attached below the motor onto said shaft but above the said pump, the inlet of which pump is at its lower extremity, a toroidal catch basin movable vertically to an upper position to surround the sprayer to collect the sprayed liquid, and also movable to a lower position where it does not surround the sprayer, the said sprayer having a plurality of spaced holes around its periphery to spray liquid horizontally, a stationary, horizontal contact bed that removes gaseous pollutants positioned below the discharge holes in the said sprayer but above the inlet of the liquid pump, the contact bed having a correspondingly tapering hole to receive the liquid pump to give a close fit to prevent substantial air passage therethrough, a basin reservoir below the said contact bed, and means below the inlet of the rotatable pump and within the basin reservoir to prevent the liquid from funneling, an air passageway with an air inlet joined to the basin reservoir, an air passageway with an air exhaust beyond the contact bed, the said motor, sprayer, and contact bed being encased, the basin reservoir being a part of the encasement, whereby the air is drawn by suction, enters through the air inlet passageway, then passes into the basin reservoir, then upwardly through the contact bed, where it engages the large surface area of the material in the said bed, and finally is exhausted through the aforesaid outlet passageway as purified air.

5. In an apparatus as set out in claim 3, for the purification of air, the combination of parts, wherein the means for preventing funneling below the inlet of the vertical pump comprises a pair of partitions intersecting at right angles to provide vanes.

6. In an apparatus as set out in claim 3 for the purification of air, the combination with a particulate filter near the air inlet and within the inlet passageway and on the other side of the entry point of the air into the basin reservoir.

7. In an apparatus as set out in claim 3 for the purification of air, the combination wherein there is a door covering an opening that leads into the reservoir basin to permit the introduction of chemicals and water into said reservoir basin.

8. In an apparatus for the purification of air as set out in claim 3, wherein the contact bed for the pollutant-removal is characterized by granular activated alumina impregnated with sodium carbonate, the said alumina having a large surface area for effective contact of the air with the surfaces of it, and of a mesh size that permits ready passage of the air under suction caused by the blower wheel through the impregnated activated alumina.

9. In an apparatus for the purification of air as set out in claim 3 wherein the holes in the sprayer are spaced both circumferentially and vertically to give a greater area of the spray than otherwise and more even spray of the liquid during operation of the liquid pump with sprayer.

References Cited
UNITED STATES PATENTS

| | | | |
|---|---|---|---|
| 2,143,628 | 1/1939 | Lea | 55—230 XR |
| 2,826,398 | 3/1958 | Norris. | |
| 3,299,620 | 1/1967 | Hollingworth | 21—53 XR |
| 3,348,821 | 10/1967 | Martin et al. | 55—259 XR |

JAMES H. TAYMAN, Jr., Primary Examiner

U.S. Cl. X.R.

21—74, 53; 23—4, 252; 55—229, 230, 233, 258, 259, 260, 279; 261—83, 88, 90